United States Patent [19]
Wideman et al.

[11] Patent Number: 5,872,167
[45] Date of Patent: Feb. 16, 1999

[54] RUBBER STOCKS CONTAINING A METAL SALT OF HYDROXY ARYL SUBSTITUTED MALEAMIC ACID

[75] Inventors: Lawson Gibson Wideman, Tallmadge; George Frank Balogh, North Canton; Denise Jeannette Keith, Akron, all of Ohio

[73] Assignee: The Goodyear Tire & Rubber Company, Akron, Ohio

[21] Appl. No.: 777,034

[22] Filed: Oct. 16, 1991

[51] Int. Cl.⁶ .................................................. C08K 5/098
[52] U.S. Cl. ........................ 524/323; 524/327; 524/328; 525/274; 525/296
[58] Field of Search ................................. 525/274, 296; 524/323, 327, 328

[56] References Cited

U.S. PATENT DOCUMENTS

| | | | |
|---|---|---|---|
| 3,897,583 | 7/1975 | Bellamy | 428/256 |
| 3,993,847 | 11/1976 | Kondo | 428/451 |
| 4,325,884 | 4/1982 | Kang | 556/148 |
| 4,433,114 | 2/1984 | Coran et al. | 525/332.6 |
| 4,605,696 | 8/1986 | Benko et al. | 525/136 |
| 5,049,618 | 9/1991 | Wideman et al. | 525/136 |

FOREIGN PATENT DOCUMENTS

| | | |
|---|---|---|
| 60-163831 | 7/1985 | Japan . |
| 2843911986 | 12/1986 | Japan . |

OTHER PUBLICATIONS

Tawney et al, Vulcanization with Maleimides, J. Appl. Sci., 8, 2281 (1964).

*Primary Examiner*—Cecilia J. Tsang
*Assistant Examiner*—Patrick R. Delaney
*Attorney, Agent, or Firm*—Bruce J Hendricks

[57] ABSTRACT

The present invention relates to rubber stocks containing a metal salt of hydroxy-aryl substituted maleamic acid. The rubber stocks compounded with the cobalt salts of hydroxy-aryl substituted maleamic acid exhibit improved aged rubber/wire adhesion. The rubber stocks compounded with sodium salts of hydroxy-aryl substituted maleamic acid exhibit improved peel adhesion.

11 Claims, No Drawings

RUBBER STOCKS CONTAINING A METAL SALT OF HYDROXY ARYL SUBSTITUTED MALEAMIC ACID

BACKGROUND OF THE INVENTION

A pneumatic tire is a polymeric composite and is a complex system of interacting components, each with specific properties for maximum effectiveness. One of the more important components of a tire is the tread. Since the tread of a tire comes into contact with the road, it is particularly compounded with various fillers and rubbers for traction. For example, to achieve good traction in a tire tread, the tread stock should exhibit a low rebound for increased hysteresis. Since there is a continuing effort to improve the traction of the tread of a tire, any rubber composition which exhibits improved rebound is desired.

Aside from complicated compounding of certain components of a tire, a frequent problem in making a rubber composite is maintaining good adhesion between the rubber and the reinforcement. A conventional method in promoting the adhesion between the rubber and the reinforcement is to incorporate a cobalt compound. Examples of cobalt compounds which are conventionally used include cobalt naphthenate, cobalt linoleate, cobalt stearate, cobalt oleate, cobalt acetate, cobalt neodecanate, cobalt tallate, cobalt resinate, cobalt acetonate, Manoband™ C and the like. Conventionally, the anion of these cobalt compounds has not shown to be of a major effect in the rubber stocks to which they are compounded. Whereas there is a continued need for cobalt compounds, there is a remaining desire to find cobalt compounds which are more effective.

SUMMARY OF THE INVENTION

The present invention relates to a rubber stock composition comprising (a) a rubber selected from the group consisting of a natural rubber, a rubber derived from a diene rubber or mixtures thereof, and (b) from about 0.1 phr to about 10 phr of a metal salt of a hydroxy-aryl substituted maleamic acid of the formula:

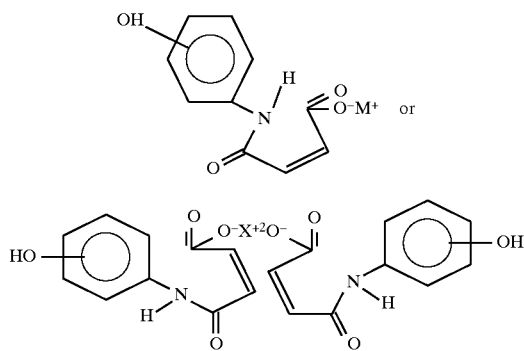

where $M^+$ is sodium or potassium cation and $X^{+2}$ is cobalt or zinc cation.

DETAILED DESCRIPTION OF THE PREFERRED EMBODIMENT

In accordance with an embodiment of the present invention, the level of the metal salt of a hydroxy-substituted maleamic acid in the rubber may vary. For example, the level of the metal salt of a hydroxy-aryl substituted maleamic acid may range from about 0.1 to about 10 parts by weight per 100 parts by weight of rubber (also referred to herein as phr). Preferably, the level of a metal salt of a hydroxy-aryl substituted maleamic acid ranges from about 0.5 to about 5 phr.

Representative of the compounds of the above formula are sodium N-(3-hydroxyphenyl) maleamate, sodium N-(4-hydroxyphenyl) maleamate, potassium N-(3-hydroxyphenyl) maleamate, potassium N-(4-hydroxyphenyl) maleamate, cobalt N-(3-hydroxyphenyl) maleamate, cobalt N-(4-hydroxyphenyl) maleamate, zinc N-(3-hydroxyphenyl) maleamate and zinc N-(4-hydroxylphenyl) maleamate. For example, use of the sodium salt of hydroxyl phenyl maleamic acid has improved the peel adhesion in compounded rubber without a detrimental effect on the state of cure in delta torque, hardness and rebound values and 300% modulus values. In addition, use of the cobalt salt in rubber stocks having utility as a wire coat stock exhibit improved aged wire adhesion.

The use of a metal salt of a hydroxy-aryl substituted maleamic acid can improve many properties of a natural rubber or a rubber derived from a diene monomer. The term "rubber derived from a diene monomer" includes the homopolymerization products of butadiene and its homologues and derivatives, as for example, methyl-butadiene, dimethylbutadiene and pentadiene as well as copolymers such as those formed from butadiene or its homologues or derivatives with other unsaturated organic compounds. Among the latter are acetylenes, for example, vinyl acetylene; olefins, for example, isobutylene, which copolymerizes with isoprene to form butyl rubber; vinyl compounds, for example, acrylic acid, acrylonitrile (which polymerizes with butadiene to form NBR), methacrylic acid and styrene, the latter polymerizing with butadiene to form SBR, as well as vinyl esters and various unsaturated aldehydes, ketones and ethers, e.g. acrolein, methyl isopropenyl ketone and vinylethyl ether. Also included are the various synthetic rubbers prepared by the homopolymerization of isoprene and the copolymerization of isoprene and other diolefins in various unsaturated organic compounds. Also included are the synthetic rubbers such as 1,4-cis-polybutadiene and 1,4-cis-polyisoprene and similar synthetic rubbers.

Specific examples of synthetic rubbers include neoprene (polychloroprene), polybutadiene (including trans and cis-1,4-polybutadiene), polyisoprene (including cis-1,4-polyisoprene), butyl rubber, copolymers of 1,3-butadiene or isoprene with monomers such as styrene, acrylonitrile and methyl methacrylate, as well as ethylene/propylene/diene monomer (EPDM) and in particular ethylene/propylene/dicyclopentadiene terpolymers. The preferred rubbers for use in the present invention are polybutadiene, polyisobutylene, EPDM, butadiene-styrene copolymers, cis, 1,4-polyisoprene and polychloroprenes.

In those instances where one desires to use the rubber stock of the present invention in a wire coat stock, for example when a cobalt salt of a hydroxy-aryl substituted maleamic acid is used, the rubber stock contains a "methylene donor" and a "methylene acceptor". The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative of compounds which may be used as a methylene acceptor include resorcinol and hydroxyphenylmonomaleimides of the formula:

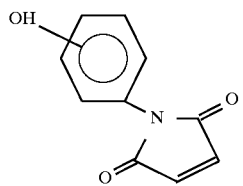

Use of the hydroxyphenylmaleimides of the above formula is disclosed in U.S. Pat. No. 5,049,418, filed Sep. 5, 1989, which is incorporated by reference herein in its entirety.

The amount of methylene acceptor that is included in the rubber stock may vary depending on the type of rubber, the particular methylene acceptor, the particular methylene donor and the desired physical properties, i.e., adhesion and tear. Generally speaking, the amount of methylene acceptor may range from about 0.1 to about 10 phr. Preferably, the amount of methylene acceptor ranges from about 0.5 to about 5.0 phr.

The rubber stock of the present invention contains a methylene donor which is suitable for reaction with the methylene acceptor. Examples of methylene donors which are suitable for use in the present invention include hexamethylenetetramine, hexaethoxymethylmelamine, hexamethoxymethylmelamine, lauryloxymethoxypyridinium chloride, ethoxymethylpyridinum chloride, trioxan hexamethoxymethylmelamine, the hydroxy groups of which may be esterified or partially esterified, and polymers of the methylene donors may be N-substituted oxymethylmelamines of the formula:

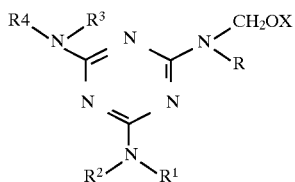

wherein X is an alkyl having from 1 to 8 carbon atoms, R, R1, R2, R3 and R4 are individually selected from the group consisting of hydrogen, an alkyl having from 1 to 8 carbon atoms, the group —CH$_2$OX or their condensation products. Specific methylene donors include hexakis-(methoxymethyl)melamine, N,N',N"-trimethyl/N,N',N" -trimethylolmelamine, hexamethylolmelamine, N,N',N"- dimethylolmelamine, N-methylolmelamine, N,N'- dimethylolmelamine, N,N',N"-tris(methoxymethyl) melamine and N,N'N"-tributyl-N,N',N"-trimethylol- melamine. The N-methylol derivatives of melamine are prepared by known methods.

The amount of methylene acceptor that is present in the rubber stock may vary depending on the type of rubber, the particular methylene acceptor, the particular methylene donor and the desired physical properties, i.e., adhesion and tear. Generally speaking, the amount of methylene donor may range from about 0.1 to about 10 phr. Preferably, the amount of methylene donor ranges from about 0.5 to about 5.0 phr.

The weight ratio of methylene donor to methylene acceptor can vary. Generally speaking, the weight ratio will range from about 1:10 to about 10:1. Preferably, the weight ratio ranges from about 1:3 to 3:1.

When the rubber stock of the present invention is to be used in wire coat applications, the rubber stock preferably contains the cobalt salt of the hydroxy-aryl substituted maleamic acid. While such salts are contemplated to be used in place of conventional cobalt compounds, one may use the metal salt of the hydroxy aryl substituted maleamic acid in addition to such conventional cobalt compounds. Therefore, the rubber stocks may contain conventional amounts of a cobalt compound, ranging from about 0.1 to about 4 phr. Examples of compounds which may be used include the cobalt salts, cobalt naphthenate, cobalt linoleate, cobalt stearate, cobalt oleate, cobalt acetate, cobalt neodecanoate, cobalt tallate, cobalt resinate, cobalt acetonate, or in situ salts prepared from cobalt hydroxide and an organic acid such as naphthenic acid, stearic acid, oleic acid, acetic acid, linoleic acid and the like. Additional cobalt compounds which may be used are known under the tradename Manoband™ C. Manoband™ C is a cobalt complex of an organic acid containing boron manufactured by Manchem Company. Manoband™ C is described in British Patent No. 972,804, which is incorporated by reference in its entirety. A particularly preferred amount of cobalt compound used in these rubber stocks range from about 0.5 to about 3 phr.

As known to one skilled in the art, in order to cure a rubber stock, one needs to have a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking, the amount of sulfur vulcanizing agent ranges from about 0.1 to about 8 phr with a range of from about 1.5 to about 6 being preferred.

Conventional rubber additives may be incorporated in the rubber stock of the present invention. The presence of a sulfur vulcanizing agent and conventional additives are not considered to be an aspect of this invention which is primarily directed to the utilization of rubber stock containing with a metal salt of a hydroxy-aryl substituted maleamic acid. The additives commonly used in rubber stocks include fillers, plasticizers, curatives, processing oils, retarders, antiozonants, antioxidants and the like. The total amount of filler that may be used may range from about 30 to about 80 phr, with a range of from about 45 to about 70 phr being preferred. Fillers include silicas, clays, calcium carbonate, calcium silicate, titanium dioxide and carbon black. HAF Black (N-330) and GPF-Black (N-660) are commonly used in rubber stocks. Preferably, at least a portion of the filler is carbon black. Plasticizers are conventionally used in amounts ranging from abut 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, saturated and unsaturated hydrocarbons and nitrogen bases, coal tar products, cumarone-indene resins and esters such as dibutylphthalate and tricresyl phosphate. Materials used in compounding which function as an accelerator-activator includes metal oxides such as zinc oxide, magnesium oxide and litharge which are used in conjunction with acidic materials such as fatty acid, for example, stearic acid, oleic acid, murastic acid and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred.

Accelerators may be used to control the time and/or temperature required for vulcanization of the rubber stock. As known to those skilled in the art, a single accelerator may be used which is present in amounts ranging from about 0.2 to about 2.0 phr. In the alternative, combinations of two or more accelerators may be used which consist of a primary accelerator which is generally used in a larger amount (0.3 to about 2.0 phr), and a secondary accelerator which is generally used in smaller amounts (0.05 to about 0.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-dimethyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide and N-cyclohexyl-2-benzothiazolesulfenamide. Preferably, the accelerator is a sulfenamide.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

Preformed phenol-formaldehyde type resins may be used in the rubber stock and are generally present in an amount ranging from about 1.0 to about 5.0 phr, with a range of from about 1.5 to about 3.5 phr being preferred.

Conventionally, antioxidants and some times antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

The rubber stock of the present invention has a particular utility in a composite. Examples of such composites include tires, belts or hoses.

The metal salt of hydroxy aryl substituted maleamic acid may be compounded in either the productive or nonproductive stock. Preferably, the metal salt of hydroxy aryl substituted maleamic acid is compounded in the nonproductive stock because more uniform mixing is generally achieved. Incorporation of the metal salt of hydroxy aryl substituted maleamic acid into the sulfur vulcanizable rubber may be accomplished by conventional means of mixing such as by the use of a Banbury or Brabender.

For purposes of the following examples, cure properties were determined using a Monsanto oscillating disc rheometer which was operated at a temperature of 150° C. and at a frequency of 100 cpm (1.667 Hz.). A description of oscillating disc rheometers can be found in the Vanderbilt Rubber Handbook edited by Robert O. Babbit (Norwalk, Conn., R.T. Vanderbilt Company, Inc., 1978), pages 583–591. The use of this cure meter and standardized values read from the curve as specified in ASTM D-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stock that is being tested is required to oscillate the rotor at the vulcanization temperature. The values obtained using this cure test are very significant since changes in the rubber or the compounding recipe are very readily detected. It is obvious that it is normally advantageous to have a fast cure rate.

Some of the following tables report cure properties that were determined from cure curves that were obtained for the various rubber formulations that were prepared. These properties include the total increase in torque (Delta Torque) and minutes to 90% of the torque increase (t90 min.).

Peel adhesion testing was done to determine the interfacial adhesion between various rubber formulations that were prepared. The interfacial adhesion was determined by pulling one compound away from another with the two ends being pulled apart at a 180° angle to each other using an Instron machine. The area of contact was determined from placement of a Mylar sheet between the compounds during cure. A window in the Mylar allowed the two materials to come into contact with each other during curing and subsequent testing.

The following examples are presented in order to illustrate but not limit the present invention.

EXAMPLE 1

Preparation of N-(3-hydroxyphenyl)maleamic acid

A dry 3-liter 3-neck round bottom flask was fitted with a stirrer and thermocouple arrangement. The system was flushed with nitrogen and charged with 211 grams (2.15 moles) of maleic anhydride dissolved in 800 ml of xylene. The maleic anhydride was heated with stirring at 50° C. to form a solution. 3-aminophenol (220 g, 2.02 moles) was then slowly added neat to the solution with vigorous stirring over a period of about 5 minutes. The flask was again flushed with nitrogen and sealed under a nitrogen balloon. The flask was held at 50°–55° C. with vigorous stirring for 4 hours. At the end of 4 hours, the stirring was continued and the flask and contents were cooled with tap water/wet ice to 10° C. The bright yellow-colored slurry was readily poured out of the neck of the flask and vacuum filtered through a No. 4 filter paper to give a wet filter cake. The product was dried at a temperature below 50° C. in a draft hood. The yellow product was a powder melting at 115° C. Specific gravity was 1.210.

EXAMPLE 2

Preparation of Sodium N-(hydroxyphenyl) maleamate

A dry 2-liter beaker was charged with 135 ml of distilled water and 84 grams (1.0 moles) of sodium bicarbonate. The resulting mixture was stirred as 207 grams (1.0 mole) of N-(3-hydroxyphenyl)maleamic acid was slowly added with gas evolution. The thick mixture was stirred for 4 hours after the addition was complete and vacuum filtered to remove as much aqueous as possible. The filter cake was dried below 50° C. in a draft hood to give sodium N-(hydroxyphenyl) maleamate which is a tan solid melting above 200° C.

EXAMPLE 3

Preparation of Cobalt N-(hydroxyphenyl)maleamate

A dry 3-liter beaker was charged with 1500 ml of distilled water and 84 grams (1.0 mole) of sodium bicarbonate. The resulting solution was stirred as 207 grams (1.0 mole) of 3-hydroxyphenyl maleamic acid was slowly added with gas evolution. The resulting solution was stirred as 118.9 (0.5 mole) of cobalt chloride hexahydrate was slowly added. The reaction mixture was stirred at 24° C. for one-half hour. The reaction was filtered within 2 hours from start to finish. The precipitate was suction filtered and air dried to a pink solid, showing 13.0 weight percent cobalt and melting at 72–78° C.

EXAMPLE 4

Physical Testing of Sodium N-(hydroxyphenyl) maleamate

A series of tests were conducted on a basic rubber stock containing 50 parts of natural rubber, 50 parts of styrene-butadiene rubber and conventional amounts of carbon black, processing oil, stearic acid, zinc oxide, antioxidant, sulfur, accelerator and silica. Three samples were prepared. Sample 1 was a control and contained no sodium N-(hydroxyphenyl)-maleamate. Sample 2 contained 2 phr and Sample 3 contained 4 phr of sodium N-(hydroxyphenyl)maleamate (NaHPMA). The physical data for each sample is listed in Table I.

TABLE I

| Sample | 1 | 2 | 3 |
|---|---|---|---|
| NaHPMA (phr) | 0 | 2 | 4 |
| Rheometer, 150° C. | | | |
| Max. Torque | 32.2 | 32.8 | 32.0 |
| Min. Torque | 8.1 | 8.3 | 8.6 |
| Delta Torque | 24.1 | 24.5 | 23.4 |
| t90 (min.) | 20.1 | 18.7 | 17.6 |
| t1 (min.) | 6.8 | 6.8 | 6.5 |
| Stress Strain | | | |
| Tensile Strength, MPa | 17.09 | 17.52 | 16.38 |
| Elongation @ Break, % | 568 | 570 | 573 |
| 300% Modulus, MPa | 7.73 | 8.10 | 7.45 |
| Zwick Rebound | | | |
| RT, % | 51.3 | 50.8 | 51.0 |
| 100° C., % | 64.9 | 63.5 | 62.9 |
| Adhesion (Newtons) | | | |
| Peel Adhesion to Itself (Avg.) | 103.6 | 109.4 | 153.3 |

As can be seen from the above values, the Peel Adhesion values are higher in those samples where the metal salt of hydroxyphenyl maleamic acid is present without any severe undesirable side effects.

EXAMPLE 5

Physical Testing

Another series of tests were conducted on a rubber stock containing 100 cis-polyisoprene rubber and conventional amounts of carbon black, peptizer, silica, stearic acid, zinc oxide, insoluble sulfur, antioxidant, resorcinol, methylene donor, accelerator, and retarder.

Three samples of rubber stocks were prepared to illustrate the use of a cobalt N-(3-hydroxyphenyl)-maleamate as a cobalt source to promote aged wire adhesion. Sample 1 contained 0.84 phr of the cobalt salt, Sample 2 contained 1.0 phr of the cobalt salt and Sample 3 contained 1.19 phr of the cobalt salt. Samples 4 and 5 were controls Table II below provides the physical properties of the three samples.

TABLE II

| Sample | 1 | 2 | 3 | Control 4 | Control 5 |
|---|---|---|---|---|---|
| Cobalt N-(hydroxyphenyl) maleamate (phr) | .84 | 1.0 | 1.19 | | |
| Cobalt Naphthenoate | | | | 1.0 | 1.0 |
| Rheometer, 150° C. | | | | | |
| Min. Torque | 9.7 | 9.4 | 9.6 | 8.6 | 8.8 |
| Max. Torque | 65.4 | 67.9 | 66.2 | 67.2 | 67.0 |
| Delta Torque | 55.7 | 58.5 | 56.6 | 58.6 | 58.2 |
| t1 (min) | 2.8 | 2.9 | 2.8 | 3.2 | 3.0 |
| t25 (min) | 6.3 | 6.6 | 6.3 | 6.5 | 6.3 |
| t50 (min) | 9.0 | 9.3 | 8.8 | 9.0 | 8.8 |
| t75 (min) | 13.1 | 13.6 | 12.7 | 13.1 | 12.8 |
| t90 (min) | 18.9 | 20.1 | 18.2 | 19.0 | 18.4 |
| 50% Modulus (MPa) | 2.7 | 2.8 | 2.8 | 2.7 | 2.8 |
| 100% Modulus (MPa) | 4.6 | 4.6 | 4.7 | 4.5 | 4.5 |
| 150% Modulus (MPa) | 7.1 | 7.0 | 7.2 | 6.8 | 6.9 |
| 200% Modulus (MPa) | 10.0 | 9.8 | 10.1 | 9.6 | 9.7 |
| 300% Modulus (MPa) | 15.9 | 15.9 | 16.0 | 15.5 | 15.6 |
| Tensile Strength (MPa) | 22.3 | 21.3 | 21.9 | 21.6 | 20.9 |
| Elongation @ Break (%) | 428 | 406 | 415 | 419 | 403 |
| Zwick Rebound | | | | | |
| RT, % | 42.8 | 41.6 | 41.8 | 41.4 | 41.8 |
| 100° C., % | 57.1 | 55.6 | 55.8 | 55.5 | 56.0 |
| Adhesion | | | | | |
| Peel Adhesion to Itself (Avg) | 51.6 | 42.6 | 96.3 | 80.6 | 80.2 |
| Standard Wire Adhesion Test (SWAT) | | | | | |
| Original, Force in Newtons | 534 | 518 | 576 | 612 | 612 |
| Aged 20 days, 75° C., 90% RH | 299 | 450 | 396 | 309 | 298 |

As can be seen above, the aged wire adhesion values for the cobalt salt of hydroxyl aryl substituted meleamic acid show improved values over the control samples.

What is claimed is:

1. A rubber stock comprising (a) a rubber selected from the group consisting of natural rubber, a rubber derived from a diene monomer or mixture thereof, and (b) from about 0.1 to about 10 phr of a metal salt of hydroxy-aryl substituted maleamic acid of the formula:

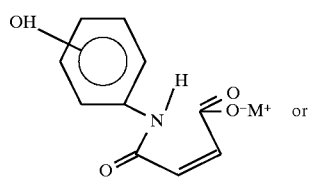 or

-continued

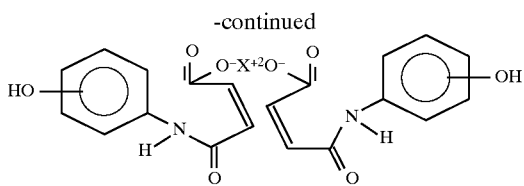

wherein M⁺ is a sodium or potassium cation and X⁺² is a cobalt or zinc cation.

2. The rubber stock of claim 1 wherein the metal salt of maleamic acid is of the formula:

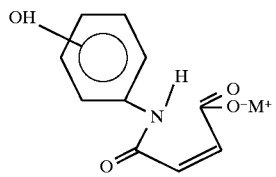

and M⁺ is a sodium cation.

3. The rubber stock of claim 1 wherein the metal salt of maleamic acid is of the formula:

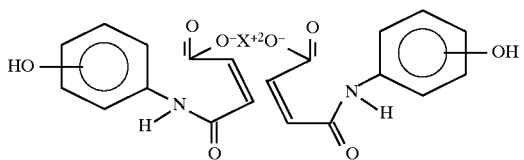

and x⁺² is a cobalt cation.

4. The rubber stock of claim 1 wherein the rubber derived from a diene monomer is selected from the group consisting of polychloroprene, polybutadiene, cis 1,4-polyisoprene, butyl rubber, EPDM, styrene/butadiene copolymers, terpolymers of acrylonitrile, butadiene and styrene and blends thereof.

5. The rubber stock of claim 1 wherein from about 0.5 to about 5 phr of metal salt of a hydroxy-aryl substituted maleamic acid is present.

6. The rubber stock of claim 1 further comprising a vulcanizing agent and a methylene donor.

7. The rubber stock of claim 6 wherein the methylene donor is selected from the group consisting of hexamethylenetetramine, hexaethoxymethylmelamine, hexamethoxymethylmelamine, lauryloxymethylpyridinium chloride, ethyloxymethylpyridinium chloride, and trioxan hexamethylolmelamine.

8. The composition according to claim 6 wherein the methylene donor is selected from the general formula:

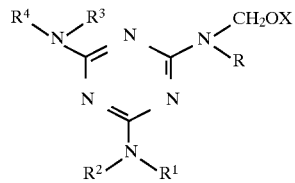

wherein X is an alkyl having from 1 to 8 carbon atoms, R, $R^1$, $R^2$, $R^3$ and $R^4$ are individually selected from the group consisting of hydrogen, an alkyl having from 1 to 8 carbon atoms, the group —CH₂OX or their condensation products.

9. The composition of claim 6 wherein the methylene donor is selected from the group consisting of hexakis (methoxymethyl)melamine, N,N',N"-trimethyl/N,N",N"-trimethylolmelamine, hexamethylolmelamine, N,N',N"-dimethylolmelamine, N-methylolmelamine, N,N'-dimethylolmelamine, N,N',N"tris(methoxymethyl) melamine and N,N",N"tributyl-N,N',N"-trimethylolmelamine.

10. The composition of claim 6 wherein the weight ratio of methylene donor to the maleamic acid may range from about 1:10 to about 10:1.

11. The composition of claim 10 wherein the weight ratio of methylene donor to the maleamic acid may range from about 1:3 to about 3:1.

* * * * *